Z. HOGAN.
SAW SET.
APPLICATION FILED MAY 13, 1911.
1,062,466.
Patented May 20, 1913.
2 SHEETS—SHEET 2.
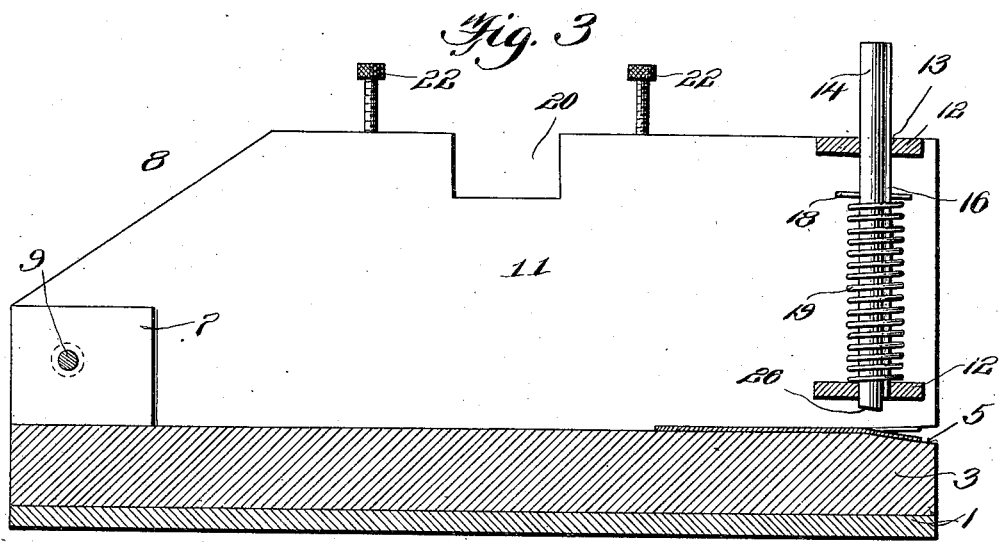
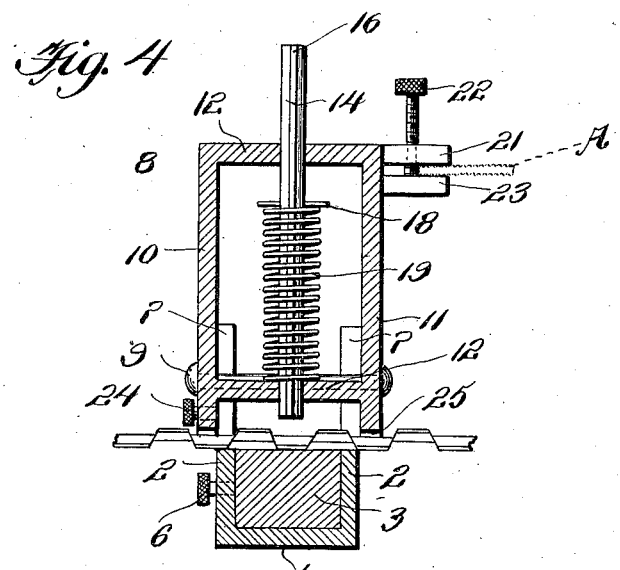
Witnesses
W. S. M. Howell
James ...
Inventor
Zachariah Hogan.
By Victor J. Evans
Attorney

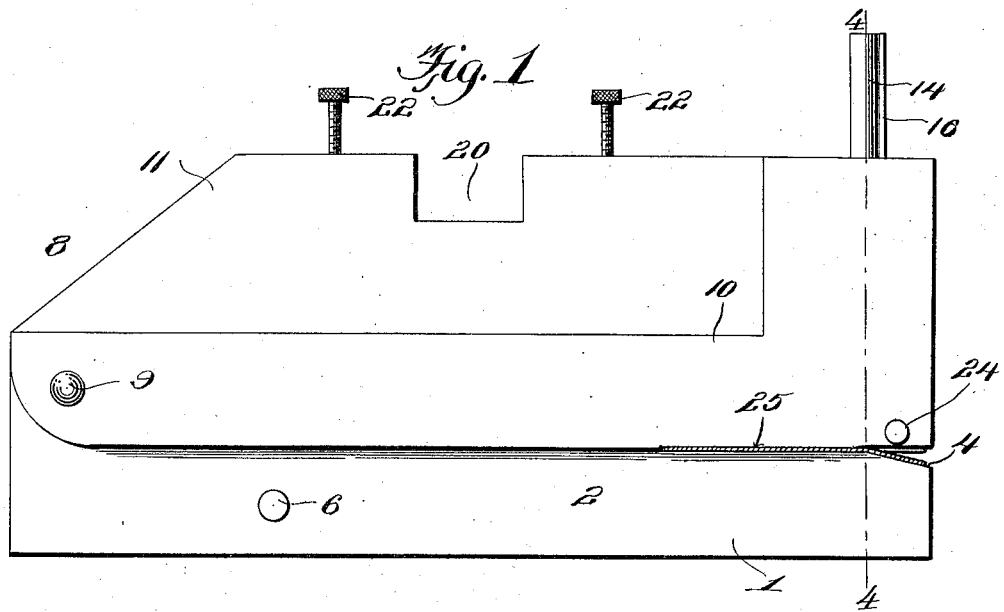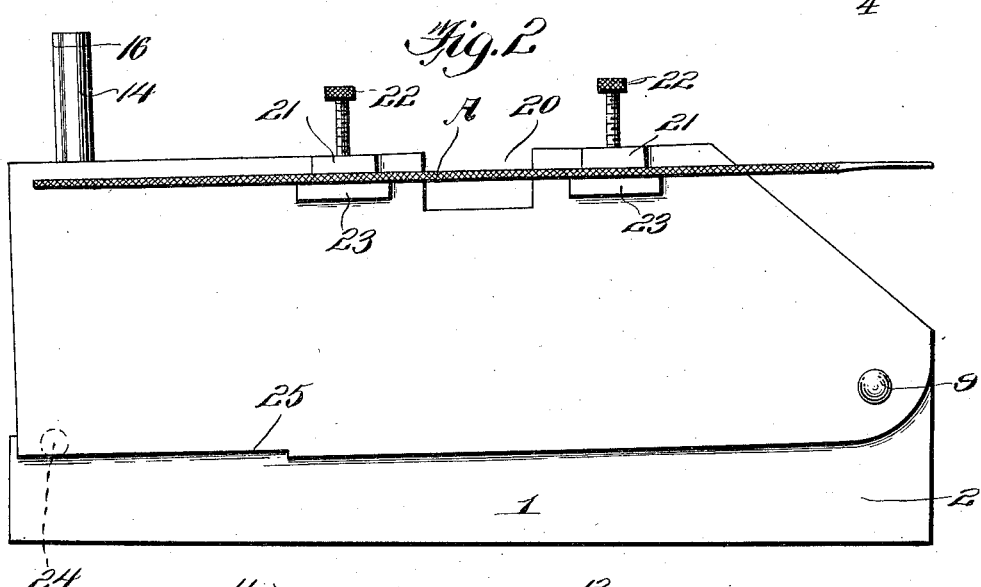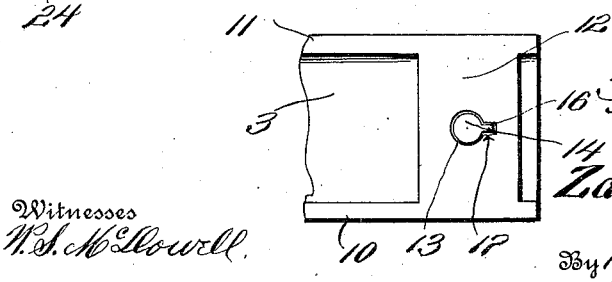

UNITED STATES PATENT OFFICE.

ZACHARIAH HOGAN, OF AMITE, LOUISIANA.

SAW-SET.

1,062,466.　　　　Specification of Letters Patent.　　Patented May 20, 1913.

Application filed May 13, 1911. Serial No. 626,885.

*To all whom it may concern:*

Be it known that I, ZACHARIAH HOGAN, a citizen of the United States, residing at Amite, in the parish of Tangipahoa and State of Louisiana, have invented new and useful Improvements in Saw-Sets, of which the following is a specification.

This invention relates to saw sets, and has for an object to provide a device of this character which will include an anvil support and a combined saw holding and hammer carrying member, the latter being designed to hold the saw securely confined against the anvil support so as to prevent the saw from springing when the tooth of the saw is struck by the anvil, thereby insuring accuracy in the setting of the teeth.

Another object of the invention is to provide means for holding the anvil support and the said combined saw holder and hammer support against relative movement, and to further provide a gage on the holding and hammer carrying member of the device, whereby the teeth of the saw can be gaged accurately during the jointing operation.

In the drawings, forming a portion of this specification and in which like numerals of reference indicate similar parts in the several views:—Figure 1 is a side view of the saw set showing the application of a saw thereto and illustrating the position of the saw in the setting operation. Fig. 2 is a similar view showing a file engaged with the device and exposed for use in the jointing operation. Fig. 3 is a longitudinal section through the device. Fig. 4 is a section taken on line 4—4 of Fig. 1. Fig. 5 is a top plan view of the hammer.

My improved saw set comprises an anvil support which includes a base member 1 on which is formed integral longitudinally extending side guides or flanges 2 which are suitably spaced from each other so as to permit of the reception therebetween of the slidably supported anvil 3. The side guides or flanges 2 of the anvil support are provided at their forward ends with beveled surfaces 4 which are designed to coöperate with a similar surface 5 at one end of the anvil. A set screw 6 on one of the guides or flanges 2 operates to engage the anvil so as to hold the same against sliding movement.

The anvil support is provided with spaced integral ears 7 to which the combined gage and saw holding member 8 is pivoted, as shown at 9. This support comprises side members 10 and 11 which are connected with each other by integral superimposed guide heads 12. These side members are provided with alining substantially key-hole passages 13 in which the sliding hammer 14 is slidably mounted, the said hammer having formed thereon a longitudinally extending rib 16 which fits into the branches 17 of the key-hole passages so as to hold the hammer against rotation. A stop pin 18 extends laterally from the hammer, and engaged thereagainst is one end of an extensile spring 19, the opposite end of the spring being seated against the head 12 so that under tension of the spring the effective striking surface of the hammer is normally disposed slightly above the working surface 5 of the anvil.

The member 11 of the combined gage and saw holder is provided with a gage opening 20 and adjacent to the opening said side member has formed thereon integral lugs 21. Set screws 22 are adjustable vertically in the lugs 21, and as illustrated, each screw has swiveled thereto a head 23.

On reference to Fig. 2 of the drawings, it will be seen that the file A may be clamped between the lugs 21 and the heads 23 so as to be exposed for effective contact with the teeth of the saw during the jointing or dressing operation. The side members 10 and 11 are adapted to be extended downwardly against the side flanges or guides 2 of the anvil support, and as shown, the member 10 is provided with a set screw 24 which is adapted to be engaged with one of the guides 2 so as to hold the anvil support and the combined gage and saw holder against pivotal movement. The side members 10 and 11, at their forward ends and on their undersides are provided with longitudinal recesses 25 which are adapted to permit of the passage of the teeth therethrough during the setting operation. In the setting operation the saw blade is placed between the saw support and the saw holding member, the latter being moved in the direction of the former so as to cause the same to bear against the saw sufficiently to hold the saw confined against the saw support at a point above the anvil. The device is then manually manipulated so as to operatively position the anvil and hammer respectively with respect to the tooth to be operated upon, after which, the hammer is struck and thereby forced against the tooth to bend the same against the surface 5 of the anvil. The underside of the hammer is beveled, at 26, to conform to the bevel 5 of the anvil. The anvil is adapted for limited longitudinal adjustment so that any required bend of the tooth can be readily obtained.

I claim:

In a device of the class described, a base, an anvil fitted in said base, an inverted U-shape combined gage and saw-holding member straddling said base, and pivoted to the rear end thereof, spaced superimposed head members arranged at the forward end of said member, a hammer disposed within said U-shaped member and supported by said head members, said saw-holding member and base being adapted to receive a saw therebetween, shoulders provided by the opposite sides of said saw-holding member and adapted to engage and limit the movement of the saw, the free end of said saw-holding member being adapted to bear against the saw at the opposite sides of the base to securely retain the saw properly positioned upon the anvil for the purpose specified.

In testimony whereof I affix my signature in presence of two witnesses.

ZACHARIAH HOGAN.

Witnesses:
 CHAS. W. CALLINGS,
 GEORGE FORSHAG.

---

Copies of this patent may be obtained for five cents each, by addressing the "Commissioner of Patents. Washington, D. C."